United States Patent
Sellnau et al.

(10) Patent No.: US 7,293,409 B2
(45) Date of Patent: Nov. 13, 2007

(54) PROCESS AND SYSTEM FOR IMPROVING COMBUSTION AND EXHAUST AFTERTREATMENT OF MOTOR VEHICLE ENGINES

(75) Inventors: Mark C. Sellnau, Bloomfield Hills, MI (US); Ather Quader, Rochester Hills, MI (US); John E. Kirwan, Troy, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/348,770

(22) Filed: Feb. 7, 2006

(65) Prior Publication Data

US 2007/0180819 A1 Aug. 9, 2007

(51) Int. Cl.
*F01N 3/00* (2006.01)

(52) U.S. Cl. ............... 60/286; 60/274; 60/295; 60/303; 48/197 R; 48/198.8; 123/1 A

(58) Field of Classification Search ............ 60/274, 60/285, 286, 295, 303; 48/197 R, 198.8; 123/1 A, DIG. 12, 3
See application file for complete search history.

(56) References Cited

U.S. PATENT DOCUMENTS

| | | | |
|---|---|---|---|
| 6,560,958 B1 * | 5/2003 | Bromberg et al. | 60/275 |
| 6,655,130 B1 | 12/2003 | Kirwan et al. | |
| 6,810,658 B2 * | 11/2004 | Kaupert et al. | 60/274 |
| 6,832,473 B2 | 12/2004 | Kupe et al. | |
| 6,843,054 B2 * | 1/2005 | Taylor et al. | 60/275 |
| 6,845,608 B2 * | 1/2005 | Klenk et al. | 60/274 |
| 6,845,610 B2 * | 1/2005 | Shiino et al. | 60/286 |
| 6,866,016 B2 | 3/2005 | Cueman | |
| 6,915,869 B2 * | 7/2005 | Botti et al. | 180/65.3 |
| 7,093,429 B1 * | 8/2006 | Cho | 60/286 |
| 2004/0146458 A1 | 7/2004 | Weissman et al. | |
| 2004/0250790 A1 | 12/2004 | Heywood et al. | |
| 2005/0022450 A1 | 2/2005 | Tan et al. | |

* cited by examiner

*Primary Examiner*—Binh Q. Tran
(74) *Attorney, Agent, or Firm*—Paul L. Marshall

(57) ABSTRACT

A diesel combustion engine system providing improved fuel combustion and exhaust aftertreatment includes: a diesel combustion engine having a liquid fuel intake, an air intake, a reformate intake, and an exhaust outlet; a liquid diesel fuel source in fluid communication with the liquid fuel intake and an on-board catalytic partial oxidation fuel reformer that receives a supply of hydrogen-containing liquid diesel fuel and a supply of air and produces therefrom a hydrogen-rich reformate. An exhaust conduit in fluid communication with the exhaust outlet and the reformer includes a reformate conduit upstream from exhaust aftertreatment components. The system provides for supplying: under conditions of low engine load, reformate or a combination of liquid diesel fuel and reformate to the engine; under conditions of medium engine load, a combination of liquid diesel fuel and reformate to the engine; and, under conditions of high engine load, liquid diesel fuel only to the engine and reformate only to the exhaust conduit.

18 Claims, 1 Drawing Sheet

PROCESS AND SYSTEM FOR IMPROVING COMBUSTION AND EXHAUST AFTERTREATMENT OF MOTOR VEHICLE ENGINES

TECHNICAL FIELD

The present invention relates to the combustion of hydrocarbon fuels and the generation of exhaust in internal combustion engines and, more particularly, to a process and system for improving fuel combustion and exhaust aftertreatment in a diesel engine.

BACKGROUND OF THE INVENTION

Internal combustion engines, including diesel engines, operate by the controlled combustion of hydrocarbon fuels and produce exhaust gases containing complete combustion products such as carbon dioxide ($CO_2$) and water ($H_2O$), and incomplete combustion products such as carbon monoxide (CO) and unburned hydrocarbons (HC). Further, the very high temperatures produced by the burning of the hydrocarbon fuels with air results in the detrimental formation of nitrogen oxide compounds ($NO_x$). Certain undesirable components of the exhaust, including CO, HC, $NO_x$, and soot particulates must be controlled to meet government emissions regulations.

Diesel engines are characterized by higher thermal efficiency than gasoline engines because of their high compression ratios, but they typically generate higher levels of $NO_x$ and particulate emissions than gasoline engines. To reduce these emissions to required low levels, premixed diesel combustion technology is being developed that provides for the fuel-air charge to be well mixed and diluted, thereby enabling combustion to occur at low temperatures without local rich zones. One approach to premixed combustion is to reduce engine compression ratio, increase charge dilution with exhaust gas, and inject fuel incrementally into the cylinder during the compression stroke. Generally, this lengthens the ignition delay period to provide more time for fuel-air mixing. This approach works best at medium engine loads but not very well at high loads or very low loads. Engine load refers to relative torque, i.e., the ratio of actual torque to maximum torque at a given engine speed. Medium loads may be defined as lying between about one-third and about two-thirds of maximum torque. Accordingly, low loads are below about one-third maximum torque, and high loads are above about two-thirds maximum torque.

For high loads, detonation of the fuel-air mixture may produce high combustion rates and noise. For very low loads, the mixture is very lean and ignition may become unstable, with increased occurrence of misfire cycles. The main technical challenges are control of combustion initiation, timing and rate to achieve effective premixed combustion over an extended range of engine load. Another goal is to improve emission aftertreatment performance without compromising overall engine efficiency under operating conditions where premixed combustion cannot be achieved.

The quantities of pollutants generated by incomplete combustion varies with operating conditions of the engine but are influenced predominantly by the air-to-fuel ratio in the combustion cylinder. Conditions conducive to reducing carbon monoxide and unburned hydrocarbons, i.e., a fuel mixture just lean of stoichiometric and high combustion temperatures, cause an increased formation of $NO_x$, and conditions conducive to reducing the formation of $NO_x$, i.e., rich fuel mixture and low combustion temperatures, cause an increase in carbon monoxide and unburned hydrocarbons in the exhaust gases. As a result, significant amounts of CO, HC and $NO_x$ are emitted within the region of stable operation of a typical diesel engine.

One approach for treating nitrogen oxides in exhaust gases is to incorporate a $NO_x$ adsorber, also referred to as a "lean-$NO_x$ trap," in the exhaust lines. The $NO_x$ adsorber promotes the catalytic oxidation of nitrogen oxides by catalytic metal components effective for such oxidation, such as precious metals. The formation of $NO_2$ is generally followed by the formation of a nitrate when the $NO_2$ is adsorbed onto the catalyst surface. The $NO_2$ is thus "trapped", i.e., stored, on the catalyst surface in the nitrate form. The system can be periodically operated under fuel-rich combustion to regenerate the $NO_x$ adsorber. During this period of fuel-rich combustion, the absence of oxygen and the presence of a reducing agent promote the release and subsequent reduction of the stored nitrogen oxides. However, this period of fuel-rich combustion may also result in a significant fuel penalty.

As already noted, exhaust gas streams can further comprise particulate matter such as carbon-containing particles or soot. A particulate filter is commonly used with a compression-ignition engine to prevent the carbon particles or the soot from exiting a tailpipe. The particulate filter may be a stand-alone device separate and distinct from devices employing catalytic elements for removing undesirable $NO_x$ gaseous components. Carbon particles can be trapped in the particulate filter and then periodically burned to regenerate the filter.

Reformates are hydrogen-enriched fuels that can be produced from a variety of sources, including gasoline, diesel, and other liquid or gaseous fuels. On-board reformers for producing hydrogen-enriched reformate fuels are described in, for example, U.S. Pat. Nos. 6,655,130, 6,832,473, and 6,866,016, and in U.S. Patent Appl. Publ. Nos. 2004/0146458, 2004/0250790, and 2005/0022450, the disclosures of which are incorporated herein by reference.

SUMMARY OF THE INVENTION

The present invention is directed to a diesel combustion engine system comprising: a diesel combustion engine having a liquid fuel intake, an air intake, a reformate intake, and an exhaust outlet; a liquid diesel fuel source in fluid communication with the liquid fuel intake and an on-board catalytic partial oxidation fuel reformer that receives a supply of hydrogen-containing liquid diesel fuel and a supply of air and produces therefrom a hydrogen-rich reformate. An exhaust conduit in fluid communication with the exhaust outlet and the reformer comprises a reformate conduit upstream from exhaust aftertreatment components selected from the group consisting of oxidation catalysts, $NO_x$ adsorbers, particulate filters, and combinations thereof. The system further comprises control means for: (a) supplying, under conditions of low engine load, reformate or a combination of liquid diesel fuel and reformate to the engine, (b) supplying, under conditions of medium engine load, a combination of liquid diesel fuel and reformate to the engine, and (c) supplying, under conditions of high engine load, liquid diesel fuel only to the engine and reformate only to the exhaust conduit.

The present invention is further directed to a process for improving fuel combustion and exhaust aftertreatment in a diesel engine. The process comprises: producing a hydrogen-rich reformate from hydrogen-containing liquid diesel fuel supplied to an on-board catalytic partial oxidation fuel reformer from a liquid diesel fuel source in fluid communication with the reformer and with a premixed diesel combustion engine having a liquid fuel intake, an air intake, a reformate intake, and an exhaust outlet; supplying, under conditions of low engine load, reformate or a combination of liquid diesel fuel and reformate to the engine; supplying, under conditions of medium engine load, a combination of liquid diesel fuel and reformate to the engine; and supplying, under conditions of high engine load, liquid diesel fuel only to the engine and reformate only to an exhaust conduit that is in fluid communication with the exhaust outlet and the reformer comprises a reformate conduit upstream from exhaust aftertreatment components selected from the group consisting of oxidation catalysts, $NO_x$ adsorbers, particulate filters, and combinations thereof. In accordance with the invention, fuel combustion is improved under conditions of low engine load and medium engine load, and exhaust aftertreatment is improved under conditions of high engine load.

DESCRIPTION OF THE PREFERRED EMBODIMENTS

In a diesel engine capable of operating in a premixed combustion mode, conventional diesel combustion can be advantageously employed at high loads and at very low loads, premixed combustion being most suitable under conditions of low and medium loads. Exhaust aftertreatment components included in the exhaust conduit are used to control NOx and particulate emissions, especially for conventional diesel combustion at high and very low engine loads.

The reformate produced by an on-board catalytic fuel reformer in the engine system of the present invention can be combined with the liquid diesel fuel to enable a wide range of cetane numbers to be achieved, which allows for controlled variation of the timing and rate of premixed diesel combustion.

The diesel combustion engine system of the present invention provides for good combustion performance at low, medium, and high engine loads. For a given engine speed, low engine load is considered to lie at or below about one-third maximum engine torque, medium engine load between about one-third and about two-thirds of maximum engine torque, and high engine load at or above about two-thirds of maximum engine torque.

For robust premixed combustion at light engine loads it is preferable to use very high levels of reformate, with only late diesel fuel injection as an ignition trigger. These conditions offer most of the benefit of 100% reformate in spark ignition combustion, in particular, start-up at low temperatures, with very low $NO_x$ and essentially no HC emissions.

In a preferred embodiment of the invention, reformate is conveyed under high engine load conditions via the reformate conduit to the exhaust conduit, where it may be employed at high temperatures to regenerate aftertreatment components such as $NO_x$ adsorbers and particulate filters. In addition to its combination with diesel fuel in the engine under low and medium load conditions, reformate may also be conveyed to the aftertreatment components of the exhaust conduit to regenerate them.

Figure 1:
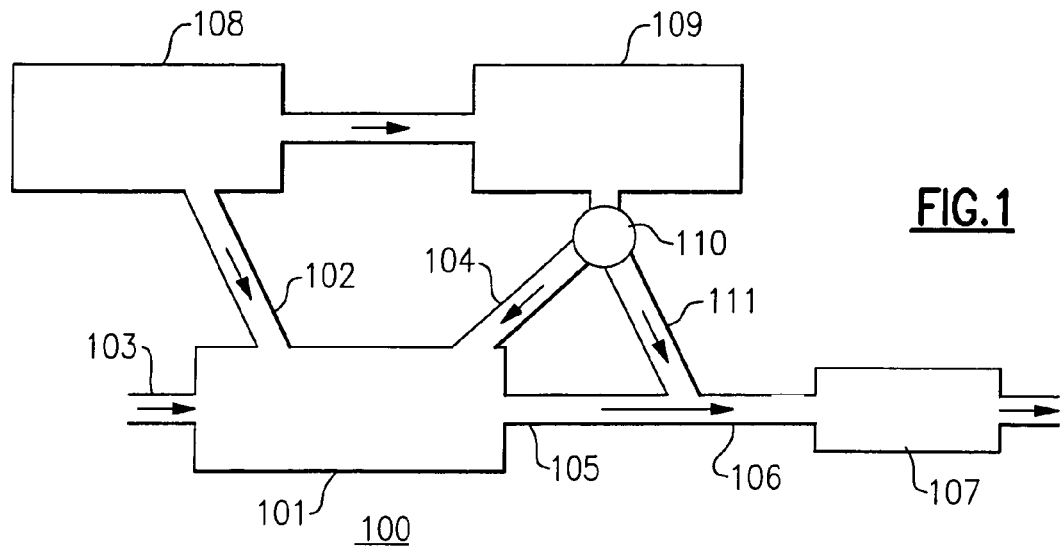
FIG. 1 is a schematic illustration of the diesel combustion engine system of the present invention.

Referring to FIG. 1, a diesel combustion engine system 100 includes a diesel engine 101 having a liquid fuel intake 102, an air intake 103, a reformate intake 104, and an exhaust outlet 105 connected to an exhaust conduit 106 that includes exhaust aftertreatment components 107. The directions of gas and liquid flows are indicated by arrows.

A liquid fuel source 108 is connected to engine 101 via fuel intake 102 and to a reformer 109 that produces a hydrogen-rich reformate from the hydrogen-containing liquid diesel fuel supplied by fuel source 108. Reformate supply control means 110 provide for the supplying of reformate to engine 101 via reformate intake 104 under conditions of low or medium engine load, and also the supplying of reformate via reformate conduit 111 to exhaust conduit 106 under conditions of low, medium and, preferably, high engine load.

Control means 110 can include, for example, one or more control valves (not shown) located downstream of reformer 109 in order to route reformate to engine 101 and/or exhaust conduit 106, depending on need. The flow rate of reformate can be determined by, for example, measuring pressure across the control valves.

Reformate produced by reformer 109 from diesel fuel provided by fuel source 108 typically contains about 20% by volume of each of hydrogen and carbon monoxide, along with small amounts of water, carbon dioxide, and hydrocarbons. The wide range of cetane number achievable by combining the diesel fuel and reformate in various ratios can be advantageously used to optimize combustion timing and rate for premixed combustion over a wide load range.

Reformer 109 preferably comprises a catalyst and a substrate. The catalyst can be washcoated, imbibed, impregnated, physisorbed, chemisorbed, precipitated, or otherwise applied to the substrate. Possible catalyst materials include metals, such as platinum, palladium, rhodium, iridium, osmium, ruthenium, and the like, and oxides, mixtures, and alloys comprising at least one of the foregoing metals.

The reformer substrate is preferably capable of operating at temperatures up to about 1,200° C.; capable of withstanding reducing and oxidizing environments containing, for example, hydrocarbons, hydrogen, carbon monoxide, water, oxygen, sulfur and sulfur-containing compounds, combustion radicals, such as hydrogen and hydroxyl ions, and the like, and carbon particulate matter; and has sufficient surface area and structural integrity to support the desired catalyst.

Materials that can be used as the reformer substrate include alumina, zirconia, cordierite, silicon carbide, metals (e.g., stainless steel, aluminum, and the like), as well as oxides, alloys, cermets, and mixtures comprising at least one of the foregoing materials, with alumina, zirconia, and mixtures comprising alumina and/or zirconia preferred.

Although the reformer substrate can have any size or geometry, the size and geometry are preferably chosen to optimize the surface area in the given catalytic converter design parameters. The reformer substrate can have an open cell foam structure, or an extruded honeycomb cell geometry, with the cells being any multi-sided or rounded shape, with substantially square, hexagonal, octagonal or similar geometries preferred due to increased surface area and structural integrity. The substrate is formed into a cell structure with a plurality of cells arranged in a honeycomb pattern using a foam process, and the like.

Diesel fuel is injected directly into the cylinder of engine 101 by a high pressure fuel injector. The addition of reformate, which is metered into the intake manifold of engine 101 and mixed with incoming air, is expected to beneficially increase ignition delay in a premixed combustion mode. Also, since the combination of diesel fuel and reformate has a much lower cetane number than neat diesel fuel, a significant increase in load limit for premixed combustion may be achieved.

Figure 2A:
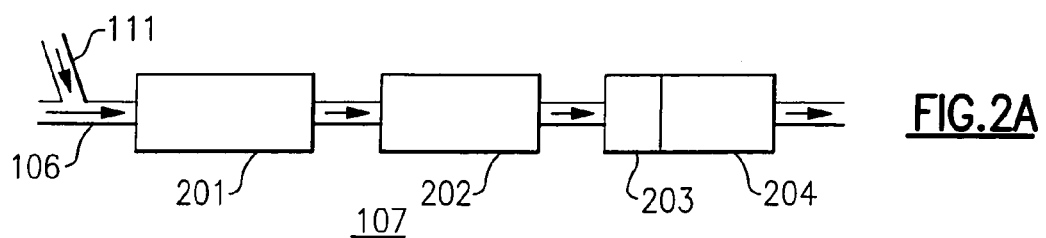
FIGS. 2A, 2B, and 2C schematically depict three embodiments of the exhaust aftertreatment components included in the diesel combustion engine system of the present invention.
Figure 2B:
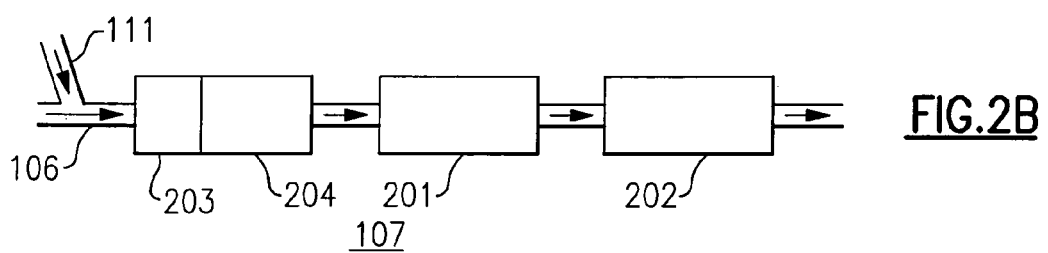
Figure 2C:
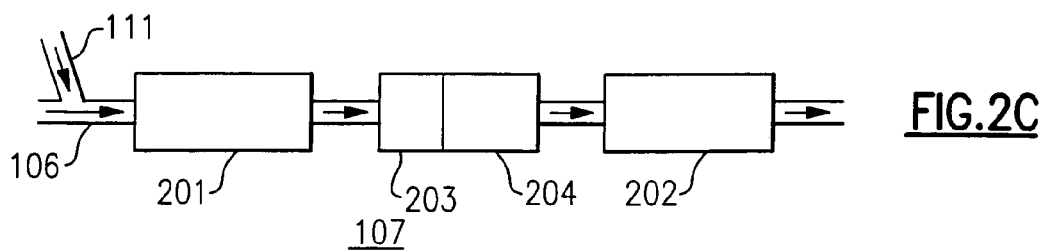

FIGS. 2A, 2B, and 2C schematically depict three embodiments of the exhaust aftertreatment components 107 in exhaust conduit 106 of the diesel combustion engine system 100 of FIG. 1. The invention is, however, not limited to the specifically illustrated configurations.

In FIG. 2A, components 107 include, disposed in serial order in downstream from reformate conduit 111, a first oxidation catalyst 201, a $NO_x$ adsorber 202, and a coupled second oxidation catalyst 203 and a particulate filter 204. The arrows in FIGS. 2A, 2B, and 2C indicate the general direction of exhaust gas flow.

As depicted in FIG. 2B, exhaust aftertreatment components 107 include, disposed in serial order downstream from reformate conduit 111, coupled second oxidation catalyst 203 and particulate filter 204, first oxidation catalyst 201, and $NO_x$ adsorber 202. Also, as depicted in FIG. 2C, exhaust aftertreatment components 107 include, disposed in serial order downstream from reformate conduit 111, first oxidation catalyst 201, coupled second oxidation catalyst 203 and particulate filter 204, and $NO_x$ adsorber 202.

Oxidation catalysts 201 or 203 preferably comprise a catalytic metal including, but not limited to, platinum, palladium, ruthenium, rhodium, osmium, iridium, gold, silver, aluminum, gallium, indium, tin, titanium, and other metals, as well as oxides, alloys, salts, and mixtures comprising at least one of the foregoing metals. Moreover, the catalyst utilized for the oxidation catalysts 201 or 203 may also be employed as the catalyst in the $NO_x$ adsorber 202 and particulate filter 204.

The $NO_x$ adsorber 202 generally comprises a porous support, a catalytic metal component, and one or more $NO_x$ trapping materials. Suitable $NO_x$ trapping materials include alkali metals, alkaline earth metals, and the like, and combinations comprising at least one of the foregoing. The catalytic metal component and $NO_x$ trapping materials can be washcoated, imbibed, impregnated, physisorbed, chemisorbed, precipitated, or otherwise applied onto and/or within the porous support.

The porous support can comprise various materials suitable for use in a spark ignition or diesel engine environment. Preferably, the porous support is selected to be capable of operating at temperatures up to about 1,200° C.; capable of withstanding exposure to hydrocarbons, nitrogen oxides, carbon monoxide, carbon dioxide, sulfur and/or sulfur oxides; and has sufficient surface area and structural integrity to support the desired catalyst. Some possible materials include zirconium toughened alumina, cordierite, silicon carbide, metallic foils, alumina sponges, porous glasses, and the like, and mixtures comprising at least one of the foregoing materials, with zirconium toughened alumina preferred.

Although the porous support can have any size or geometry, the size and geometry are preferably chosen to optimize surface area in the given catalytic converter design parameters. Generally, the porous support has a honeycomb geometry, with the combs being any multi-sided or rounded shape, with substantially square, triangular, hexagonal, or similar geometries preferred due to ease of manufacturing and increased surface area.

The porous support further comprises one or more other support materials suitable for use at the high operation temperatures associated with an internal combustion engine, e.g., up to about 1,200° C. Such materials include, but are not limited to, aluminates, alumina, and the like, as well as combinations comprising at least one of the foregoing, with gamma-alumina, theta-alumina, delta-alumina, and combinations thereof being preferred.

The catalytic metal component comprises precious metals, such as, platinum, rhodium, palladium, ruthenium, iridium and osmium, as well as alloys and combinations comprising at least one of the foregoing metals. Where the catalytic metal component is a combination of rhodium with one or more other metals, the other metals, e.g., palladium, platinum, and the like, are typically present in an amount less than the rhodium. More particularly, with a platinum/rhodium combination, the catalytic metal component can comprise up to about 95 wt. % rhodium and up to about 30 wt. % platinum; with about 70 wt. % to about 85 wt. % rhodium and about 2.5 wt. % to about 20 wt. % platinum preferred; and about 70 wt. % to about 80 wt. % rhodium and about 5 wt % to about 10 wt. % platinum especially preferred, weight percentages being based on the total weight of the alloy.

In addition to the catalytic metal component, the porous support may be further loaded with one or more $NO_x$ trapping materials such as alkali metals, alkaline earth metal, and mixtures comprising at least one of the foregoing metals. Suitable trapping materials include barium, lithium, potassium, magnesium, sodium, cesium, strontium, and combinations comprising at least one of the foregoing, with a mixture of barium and potassium being preferred.

The particulate filter 204 generally comprises a shell, an insulation material, and a filter element. The insulation material substantially covers the filter element, and the shell substantially covers the insulation material.

Possible materials for the shell include ferrous materials, such as ferritic stainless steels. Ferritic stainless steels include stainless steels such as the 400-Series, for example, SS-409, SS-439, and SS-441, and alloys, and combinations comprising at least one of the foregoing stainless steels, with grade SS-409 generally preferred.

The insulation material comprises materials such as fiberglass, intumescent materials, non-intumescent materials, ceramic mats, and/or mica based materials, including combinations comprising at least one of the foregoing insulation materials, and the like.

The filter element of particulate filter 204 can comprise one or more monoliths, substrates, supports, and the like, comprising a ceramic, metallic, cermet, and carbides, silicides, nitrides, such as silicon carbide, silicon nitride, and the like, or composite materials, and combinations comprising at least one of the foregoing materials. Such materials preferably possess a sufficient porosity to permit passage of reformat through the monolith walls, and yet filter out a substantial portion, if not all of the particulate matter present in the exhaust.

Preferably, the filter element includes a catalyst material such as precious metals such as platinum, palladium, rhodium, nickel, iron, cobalt, molybdenum, tungsten, vanadium, niobium, tantalum, their oxides and sulfides, and combinations comprising at least one of the foregoing precious metals and the like. Further, the filter element can optionally include a washcoat material such as aluminum oxide, silicon oxide, zirconium oxide, titanium oxide, cerium oxide, and combinations thereof.

Depending on the particular system architecture, diesel combustion engine system 100 may include an optional heat exchanger to reduce the reformate temperature to a temperature effective to cause regeneration and or desulfurization of the particular component of exhaust aftertreatment components 107, e.g., $NO_x$ adsorber 202, particulate filter 204, and the like. The heated reformate can then be used to regenerate and desulfate $NO_x$ adsorber 202 and/or regenerate particulate filter 204.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A diesel combustion engine system comprising:
a diesel combustion engine having a liquid fuel intake, an air intake, a reformate intake, and an exhaust outlet;
a liquid diesel fuel source in fluid communication with said liquid fuel intake and an on-board catalytic partial oxidation fuel reformer that receives a supply of hydrogen-containing liquid diesel fuel and a supply of air and produces therefrom a hydrogen-rich reformate;
an exhaust conduit in fluid communication with said exhaust outlet and with said reformer, said exhaust conduit comprising a reformate conduit upstream from exhaust aftertreatment components selected from the group consisting of oxidation catalysts, $NO_x$ adsorbers, particulate filters, and combinations thereof; and
control means for:
(a) supplying, under conditions of low engine load, reformate or a combination of liquid diesel fuel and reformate to said engine,
(b) supplying, under conditions of medium engine load, a combination of liquid diesel fuel and reformate to said engine, and
(c) supplying, under conditions of high engine load, liquid diesel fuel only to said engine and reformate only to said exhaust conduit.

2. The diesel combustion engine system of claim 1 further comprising:
control means for supplying, under conditions of low engine load, reformate to said exhaust conduit.

3. The diesel combustion engine system of claim 1 further comprising:
control means for supplying, under conditions of medium engine load, reformate to said exhaust conduit.

4. The diesel combustion engine system of claim 1 wherein said exhaust aftertreatment components in said exhaust conduit include, disposed in serial order downstream from said reformate conduit, a first oxidation catalyst, a $NO_x$ adsorber, and a coupled second oxidation catalyst and particulate filter.

5. The diesel combustion engine system of claim 1 wherein said exhaust aftertreatment components in said exhaust conduit include, disposed in serial order downstream from said reformate conduit, a coupled second oxidation catalyst and particulate filter, a first oxidation catalyst, and a $NO_x$ adsorber.

6. The diesel combustion engine system of claim 1 wherein said exhaust aftertreatment components in said exhaust conduit include, disposed in serial order downstream from said reformate conduit, a first oxidation catalyst, a coupled second oxidation catalyst and particulate filter, and a $NO_x$ adsorber.

7. A process for improving fuel combustion and exhaust aftertreatment in a diesel engine, said process comprising:
producing a hydrogen-rich reformate from hydrogen-containing liquid diesel fuel supplied to an on-board catalytic partial oxidation fuel reformer from a liquid diesel fuel source in fluid communication with said reformer and with a diesel combustion engine having a liquid fuel intake, an air intake, a reformate intake, and an exhaust outlet;
supplying, under conditions of low engine load, reformate or a combination of liquid diesel fuel and reformate to said engine;
supplying, under conditions of medium engine load, a combination of liquid diesel fuel and reformate to said engine; and
supplying, under conditions of high engine load, liquid diesel fuel only to said engine and reformate only to an exhaust conduit in fluid communication with said exhaust outlet and with said reformer, said exhaust conduit comprising a reformate conduit upstream from exhaust aftertreatment components selected from the group consisting of oxidation catalysts, $NO_x$ adsorbers, particulate filters, and combinations thereof;
wherein fuel combustion is improved under conditions of low engine load and medium engine load, and exhaust aftertreatment is improved under conditions of high engine load.

8. The process of claim 7 further comprising:
supplying, under conditions of low engine load, reformate to said exhaust conduit.

9. The process of claim 7 further comprising:
supplying, under conditions of medium engine load, reformate to said exhaust conduit.

10. The process of claim 7 wherein said exhaust aftertreatment components in said exhaust conduit comprise, disposed in serial order downstream from said reformate conduit, a first oxidation catalyst, a $NO_x$ adsorber, and a coupled second oxidation catalyst and particulate filter.

11. The process of claim 7 wherein said exhaust aftertreatment components in said exhaust conduit comprise, disposed in serial order downstream from said reformate conduit, a coupled second oxidation catalyst and particulate filte, a first oxidation catalyst, and a $NO_x$ adsorber.

12. The process of claim 7 wherein said exhaust aftertreatment components in said exhaust conduit comprise, disposed in serial order downstream from said reformate conduit, a first oxidation catalyst, a coupled second oxidation catalyst and particulate filter, and a $NO_x$ adsorber.

13. The diesel combustion engine system of claim 1 wherein said low engine load is equal to or less than about one-third of a maximum engine torque of said diesel combustion engine.

14. The diesel combustion engine system of claim 13 wherein said medium engine load is between about one-third of said maximum engine torque and about two-thirds of said maximum engine torque.

15. The diesel combustion engine system of claim 14 wherein said high engine load is equal to or greater than about two-thirds of said maximum engine torque.

16. The process of claim 7 wherein said low engine load is equal to or less than about one-third of a maximum engine torque of said diesel engine.

17. The process of claim 16 wherein said medium engine load is between about one-third of said maximum engine torque and about two-thirds of said maximum engine torque.

18. The process of claim 17 wherein said high engine load is equal to or greater than about two-thirds of said maximum engine torque.

* * * * *